United States Patent [19]
Kelly et al.

[11] Patent Number: 5,361,340
[45] Date of Patent: Nov. 1, 1994

[54] APPARATUS FOR MAINTAINING CONSISTENCY IN A MULTIPROCESSOR COMPUTER SYSTEM USING VIRTUAL CACHING

[75] Inventors: Edmund Kelly, San Jose; Michel Cekleov, Mountain View; Michel Dubois, Los Angeles, all of Calif.

[73] Assignee: Sun Microsystems, Inc., Mountain View, Calif.

[21] Appl. No.: 28,766

[22] Filed: Mar. 9, 1993

Related U.S. Application Data

[63] Continuation of Ser. No. 461,225, Jan. 5, 1990, abandoned.

[51] Int. Cl.⁵ .................. G06F 13/00; G06F 12/08
[52] U.S. Cl. ...................... 395/400; 395/425
[58] Field of Search ............... 395/400, 425; 364/DIG. 1, DIG. 2

[56] References Cited

U.S. PATENT DOCUMENTS

| | | | |
|---|---|---|---|
| 4,136,385 | 1/1979 | Gannon et al. | 395/400 |
| 4,400,770 | 8/1983 | Chan et al. | 395/400 |
| 4,785,398 | 11/1988 | Joyce et al. | 395/425 |
| 4,885,680 | 12/1989 | Anthony et al. | 395/425 |
| 4,939,641 | 7/1990 | Schwartz et al. | 395/425 |
| 4,985,829 | 1/1991 | Thatte et al. | 395/425 |
| 4,992,930 | 2/1991 | Gilfeather et al. | 395/425 |
| 5,029,070 | 7/1991 | McCarthy et al. | 395/425 |
| 5,091,846 | 2/1992 | Sachs et al. | 395/250 |
| 5,097,409 | 3/1992 | Schwartz et al. | 395/425 |
| 5,113,510 | 5/1992 | Hillis | 395/425 |
| 5,148,533 | 9/1992 | Joyce et al. | 395/425 |
| 5,222,224 | 6/1993 | Flynn et al. | 395/425 |

FOREIGN PATENT DOCUMENTS 0232526 12/1986 United Kingdom.
2221066  5/1989 United Kingdom.

Primary Examiner—Joseph L. Dixon
Assistant Examiner—Jack A. Lane
Attorney, Agent, or Firm—Blakely Sokoloff Taylor & Zafman

[57] ABSTRACT

A computer system includes first and second processors each having a virtual cache memory, a main memory, a bus coupled to the main memory and the processors, and apparatus for addressing the cache associated with each processor for providing that the data in each virtual cache stores data from the same physical location in main memory at a same index position in each virtual cache, a memory management unit (MMU) coupled to each processor such that addressing information is transferred to each memory management unit to indicate the virtual address of data to be written to the virtual cache, the memory management unit generating from the virtual address a physical address, and determining whether any other virtual cache includes data from the same physical memory positions.

2 Claims, 2 Drawing Sheets

APPARATUS FOR MAINTAINING CONSISTENCY IN A MULTIPROCESSOR COMPUTER SYSTEM USING VIRTUAL CACHING

This is a continuation of application Ser. No. 07/461,225, filed Jan. 5, 1990, now abandoned.

BACKGROUND OF THE INVENTION

1. Field of the Invention

This invention relates to computer memory systems and, more particularly, to arrangements in virtual memory systems that maintain consistency in data included in caches in multiprocessing computer systems connected through a common bus interconnect.

2. History of the Prior Art

In order to make the most advantageous use of memory in computer systems and to provide an apparently very large amount of random access memory (RAM) for use by programmers, the use of virtual memory has become prevalent. Virtual memory systems provide more addressable memory than the actual memory which exists in random access memory. Such systems provide a very large number of virtual addresses which, although they appear to be in random access memory, may actually be in any portion of memory in the system including long term memory.

This is accomplished in a demand-paged virtual memory system by dividing random access memory into a number of fixed blocks each of the same size. When a job is placed in memory, its address space is divided into pages of the same size as the blocks, and these pages are stored in the physical pages. Then, although the pages may or may not be physically contiguous, the addresses are maintained as logically contiguous by a memory management system.

This is done by assigning each block of physical memory a virtual address. The memory management unit keeps track of the relationship of the physical and virtual addresses, usually through a series of look-up tables. When information is needed for the operation of a program, its virtual address is converted into its physical memory position by the memory management unit; and the information which is presently necessary to the operation of the process (if not already there) is copied into main memory. Additional information required by the process is called to main memory as it is needed.

Computer systems have long used caches to speed the operation of the system. In a caching system, as information is called from main memory and used, it is also stored along with its address in a small area of especially fast memory called a cache. As each new read or write command is issued, the system looks to the fast cache memory to see if the information exists in the cache. A comparison of the desired address and the addresses in the cache memory is made. If an address in the cache memory matches the address sought, then there is a cache hit (the information is available in the cache). The information in the cache is then accessed so that access to main memory is not required; and the command is processed much more rapidly. If the information is not available in the cache, the new data is retrieved from the main memory and copied into in the cache ready for use. With a well designed caching system, accessed information is found in the cache on an average over ninety percent of the time.

A cache works quite rapidly when it may be directly addressed without the need of going through the memory management unit. A cache used with a virtual memory system can be addressed more efficiently using the virtual address of the information because the virtual address need not be converted to a physical address before the information can be found in the cache. A problem with virtual caches in multiprocessor systems is data consistency or "stale data" associated with address aliases, i.e. two virtual addresses mapping to a common physical address.

Computer systems have been designed which use multiple processors. The use of multiple processors allows various functions or processes to be handled by other than a single central processing unit (CPU) so that the computing power of the overall system is enhanced. When multiple processors are used in a system, it is often advantageous to utilize individual caches with each processor in order to enhance the speed of operation of each individual processor.

One special advantage offered by a multiple processor system is that the processors may share the same data because they may address the same physical memory. However, when multiple virtual caches used by multiple processors do share data, a data consistency problem arises because operations in the caches may not be reflected in the physical memory shared by the two processors at the time any particular processor looks to the physical memory for data. This is an especially difficult problem because the virtual caches involved and, in fact, all of the system memory are considered by the individual processors to be caches distinct to that processor. The virtual caches are addressed by virtual addresses. A virtual address to one processor has no meaning to another processor associated with a different virtual cache even though the two processors utilize caches which hold the same data from the same physical memory. Consequently, multiprocessor computer systems utilizing virtual caches have provided a very difficult consistency problem to the prior art.

The prior art solutions to the data consistency problem created by the use of virtual caches in multiprocessor computer systems have tended to make great use of hardware and, often, to slow the systems.

SUMMARY OF THE INVENTION

It is, therefore, an object of the present invention to eliminate the problem of data inconsistency in a multiprocessor system utilizing virtual caching.

It is another object of the present invention to reduce the complexity of addressing in multiprocessor computer systems utilizing virtual caching.

An additional object of the present invention is to eliminate the problem of data inconsistency in a multiprocessor system utilizing virtual caching without substantially increasing the cost or complexity of such a system.

These and other objects and features of the invention are realized in a computer system which includes first and second processors each having a virtual cache memory, a main memory, a bus joining the main memory and the processors, means for addressing the cache associated with each processor including indexing means for providing that the information in each virtual cache storing information from the same physical location in main memory be at the same index position in each virtual cache, a memory management unit associated with each processor, means for transferring addressing information to each memory management unit to indicate the virtual address of information to be written to the virtual cache including an index indicating the position within the cache of the information, means for generating from the virtual address both a physical address and a virtual index indicating the position within the virtual cache of the information, and means for determining from the physical address and the virtual index whether any other virtual cache includes information from the same physical memory positions.

These and other features and advantages of the invention will become apparent to those skilled in the art upon reading the following detailed description in conjunction with the drawings in which like designations have been used to describe like elements throughout the several views.

IN THE DRAWINGS

FIG. 1 is a drawing illustrating the use of memory in the system of the invention; and FIG. 2 is block diagram illustrating a computer system including the invention.

NOTATION AND NOMENCLATURE

The detailed descriptions which follow are presented to some degree in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to apparatus and to method steps for operating a computer in processing electrical or other (e.g. mechanical, chemical) physical signals to generate other desired physical signals.

DETAILED DESCRIPTION OF THE INVENTION

Figure 1:
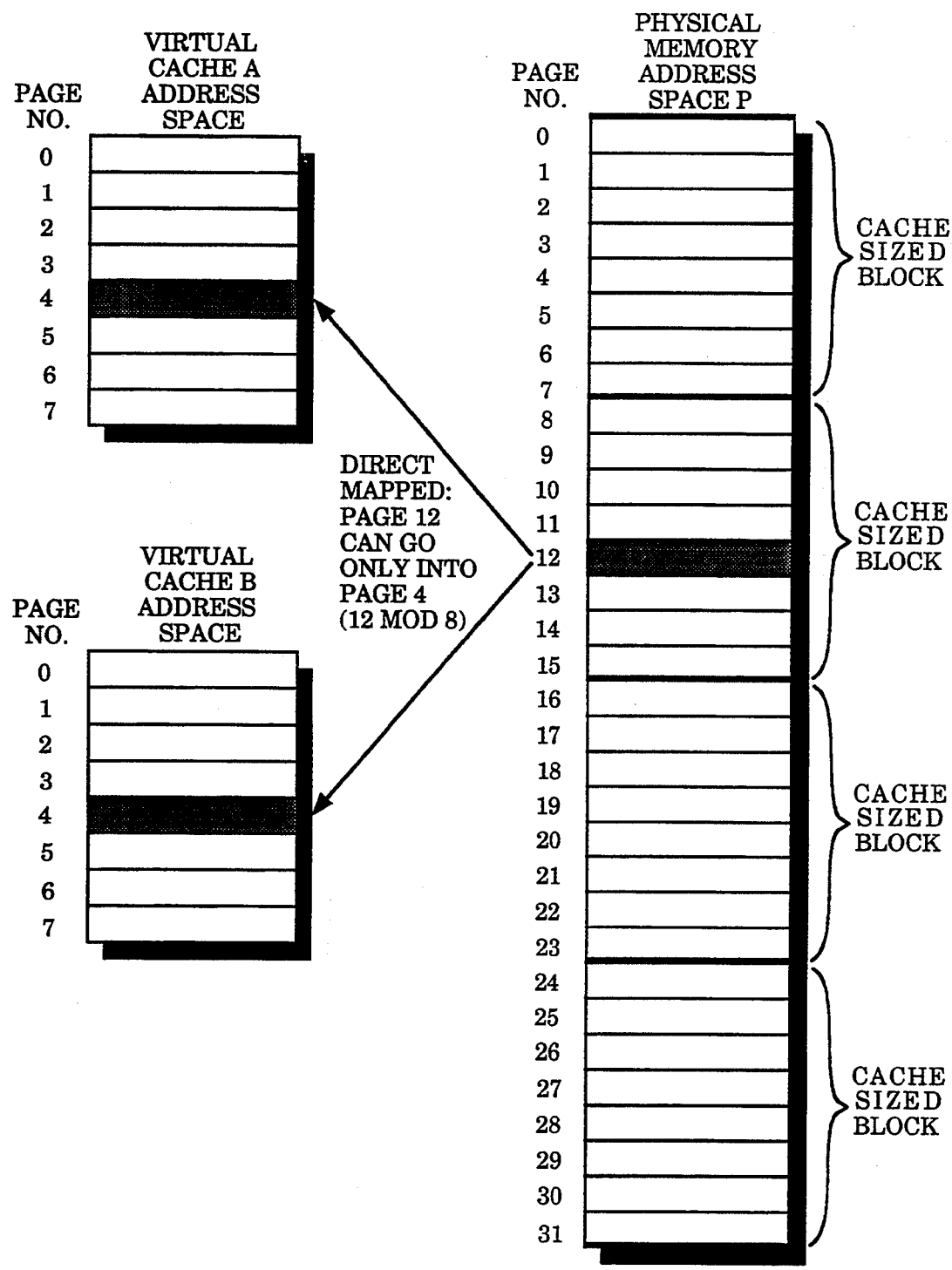

Historically, when a particular process was run by a computer system, the entire process was placed into main memory, and the central processing unit operated on the instructions and the data of that process all of which were present in main memory. As processes became larger, it became more expensive to accomplish this because more and more random access memory was required. Because the cost of main memory is higher than is the cost of other types of memory, systems utilizing virtual memory evolved.

In a virtual memory system, a very large of amount of apparent random access memory is addressable. All of this main memory is assigned virtual addresses; however, the information available at the virtual addresses may be stored in a regular physical main memory or in a slower long term memory. The information is addressed by its virtual address, and this address is translated into a physical address by circuitry usually called a memory management unit (MMU). The memory management unit associated with a central processing unit is provided, among other things, to perform this translation and to keep the information updated in the physical main memory. When information not available in regular main memory is needed by a process, that information is called from long term memory and placed in main memory. Less main memory is necessary in such a system because only that portion of a process actually required for the present function need be placed in main memory. If other portions of a process become necessary, these portions are moved into main memory and, if required, unused portions of that or other processes are eliminated from main memory to make space. Such eliminated portions are moved into long term memory for recall as necessary.

In general, in a virtual memory system, information is stored in physical memory in equal sized portions which may be referred to as pages. Typical page sizes range from one to eight kilobytes of memory. When information is transferred from long term memory to main memory, a page-sized block is usually transferred. In the usual system, the memory management unit and the operating system work together to create page map tables which may be stored in memory to keep the correspondence between the virtual memory addresses and their physical memory equivalents.

Computer systems also make use of caching to speed system operation. In the typical arrangement, the physical memory circuitry utilized for the cache memory is capable of operating more rapidly than the physical memory circuitry for main memory. Consequently, such cache memory circuitry is more expensive than the circuitry utilized for the main memory. For example, the cache memory may utilize static main memory chips which, though more expensive, operate more rapidly than do dynamic main memory chips utilized in main memory.

In order to obtain an overall system speed of operation approaching that of the cache memory, when information is requested from main memory for any particular operation by a central processing unit, that information is copied into the cache memory. When any attempt to read information is made, the first place the central processing unit looks for that information is in the associated cache memory. If the information is in the cache memory, then access to the main memory is not required; and cache speed is attained. If the information is not in the cache, it is copied there from the main memory so that it will be accessible on the next attempt.

Caching arrangements are often used in computer systems which make use of virtual memory. In such systems, a cache may be addressed by the use of virtual addresses so that no time is required to translate from a virtual to a physical address. In such a system, when a write to memory occurs at the cache level, the updated data in the cache must ultimately be written back to main memory.

Systems are well known which use multiple processors. The use of multiple processors allows various functions to be handled by other than a single central processing unit so that the computing power of the overall system is enhanced. When multiple processors are used in a system, it is sometimes advantageous to utilize individual caches with each processor in order to enhance the speed of operation of each individual processor. This provides the added advantage that when multiple caches are utilized, the processors may share the same data because they may address the same physical memory. However, in a situation in which multiple virtual caches used by multiple processors share the same data, a data consistency problem arises because operations in the caches may not be reflected in the physical memory shared by the multiple processors at the time any particular cache looks to the physical memory for data. For example, this occurs in a write-back caching system where the information in the main memory is not immediately updated. A write-back caching system is especially advantageous in a system in which main memory is accessed by processors over a bus because a write-back cache system tends to keep traffic on the system bus as low as possible.

This is an especially difficult problem in computer systems utilizing virtual memory where the caches involved are addressed by virtual addresses which are private to the individual process and are thus unknown to processes running on other processors. A virtual address for information stored in a first virtual cache used by a first process associated with one processor may have no correspondence to the virtual address of information in a first virtual cache used by a second process run by another processor even though the information is derived from the same physical location in main memory. Consequently, multiprocessor computer systems utilizing virtual caches have provided an extremely difficult data consistency problem to the prior art.

In the system of this invention, the caches utilized are direct-mapped virtually-addressed caches. A direct mapped cache is one having pages of main memory mapped to essentially similar page-sized blocks of cache memory, each of the cache page-sized blocks having lines of memory each capable of storing the same amount of information in a line as do the lines of the pages of main memory from which information may be transferred. In such a cache, a line from a page of information in main memory is typically mapped to a line of a page-sized block within the cache having the same line number as the page in main memory. In such a cache, the information from any page of main memory stored in the cache resides at the same line within a page-sized block in the cache as it does in a page of physical memory.

In prior art systems, it is usual for the size of a virtual cache to be between sixty-four and 256 Kbytes while pages of main memory may be from four to eight Kbytes. Consequently, in prior art systems, a cache might have room for from eight to sixty-four pages of main memory and a particular line of information might thus reside in as few as eight or as many as sixty-four different positions in the cache. Accessing information in such caches and avoiding data consistency (or "alias") problems require that the line position to which information might be mapped be compared for each page-sized area of the cache until a match is found. Accessing information in such caches which might reside in any of sixty-four positions thus requires a good deal of system time and hardware to accomplish.

The system of the present invention overcomes this problem by limiting the placement of information inside caches so that information from the same physical address in main memory must reside at the same location in each virtual cache rather than at one of eight or one of sixty-four different positions within each virtual cache. This is accomplished by providing to the system bus a portion of the virtual address sufficient to designate a particular page-sized area within the cache. Normally, the lower order bits of the virtual address indicating the offset within a page-sized area of the cache are the same as the lower order bits indicating the offset within a page of the physical address. In a preferred system, a virtual address may include thirty-two bits. Of these bits, the thirteen lower order bits indicate the offset within the page-sized block while the upper nineteen bits are translated to the physical page address. However, the lowest five or six bits (depending on cache size) of the upper nineteen bits unambiguously determine the position of the information in any cache by defining in which page-sized block of the cache the information lies. Typically, thirteen lower order bits are not translated by the memory management unit but are transmitted directly from the processor to the bus. If, in addition, a sufficient number of virtual address bits (the next five or six higher bits) are also transmitted directly from the processor to the bus to indicate the page-sized area of the virtual cache in which the information is located, then this information can be used with the physical address to unambiguously determine the location of the information in any other virtual cache without having to check against each possible page position in every other virtual cache.

Thus, if a page size were eight Kilobytes and a cache size were 256 Kilobytes, five additional bits of the virtual address would be necessary, a number sufficient to designate the thirty-two possible page sized positions within the cache. These additional five bits of the virtual address are then transmitted with the normal offset (the lowest 13 bits) directly to the bus while the upper portion of the virtual address including the same five bits indicating the page-sized block are sent to the memory management unit and translated to the physical address. Using this line and page offset information and the physical address, information from the same line of physical memory which resides in a plurality of different virtual caches can only be at a total offset within a cache which is the same for any other virtual cache which may share the information. The total 13 bit offset within a cache is defined by the 13 bit offset within a page-sized area and the additional 5 bits of the virtual address (called the offset index.)

Thus, in the preferred embodiment two different virtual addresses may map to a common physical address only if the virtual addresses match on the eighteen low order virtual index bits used to address the direct mapped virtual caches. By providing this limitation on the addressing of information to virtual caches, two virtual caches having information from the same physical memory position store that information at identical positions within each virtual cache. Two virtual caches which hold the same data from the same physical memory may store that information at different virtual addresses but each particular piece of information is at the same total offset-(herein called the "virtual index") in each virtual cache, at the same line and byte. This has the effect of mapping physical addresses in main memory in units the size of the cache when sharing data. This drastically increases the speed of operation of the system and reduces its complexity since a search need not be conducted to find a particular line in many different pages within a cache.

This is illustrated in FIG. 1. FIG. 1 shows physical memory P and two individual virtual caches labelled A and B. In a preferred embodiment of the invention, for example, a virtual cache may contain 256K bytes of information. Consequently, when shared information is stored in multiple virtual cache memories, although the virtual address tags of the individual caches will differ, the total offset (the virtual index) for any particular information within each cache will be the same so that the correct page-sized area of the cache is addressed to assure that the cache lines addressed are at identical positions within each cache.

For example, the information stored at the position labelled 4 in virtual cache A is the same information stored at the position labelled 4 in virtual cache B. This is the information derived by each of the virtual caches from the position labelled 12 in the physical memory. Consequently, if the virtual cache address for any cache is known, the virtual index (the lower eighteen bits of the virtual address) will be the same for each of the caches if sharing is occurring.

Presuming that the system has been in operation for some time and that information is stored in virtual cache A and in virtual cache B which has been copied from the physical memory P in main memory, when the central processing unit writes to the virtual cache B, the information at that position in both the main memory and the cache memory A may no longer be the same as that stored in the cache B. It is therefore necessary for the system to write the new information from cache B to the main memory and either invalidate or update the information in virtual cache A to reflect the new material written to the cache B so that the central processing unit associated with cache A will not be operating with stale information.

Figure 2:
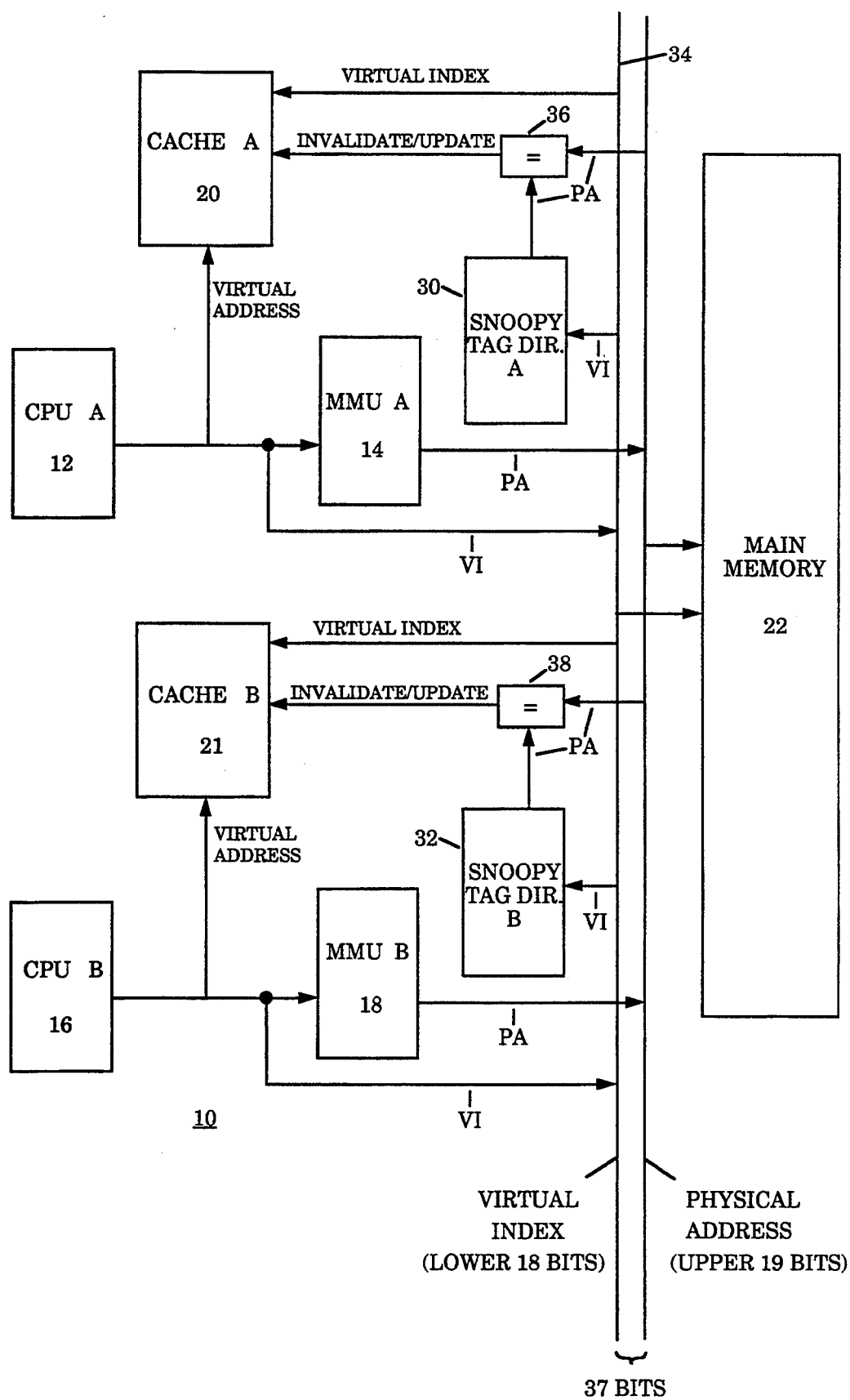

FIG. 2 illustrates a multiprocessor computer system 10. The multiprocessor computer system 10 is comprised of 2 similar processor subsystems: Processor subsystem A and processor subsystem B. Processor subsystem A is comprised of a central processing system (CPU A) 12, a memory management unit (MMU A) 14 for CPU A 12, a cache memory (CACHE A) 20 for CPU A 12, a snoopy tag directory (SNOOPY TAG DIR. A) 30 for MMU A 14, and a comparator 36 for SNOOPY TAG DIR. A 30. Similarly, processor subsystem B is comprised of a central processing system (CPU B) 16, a memory management unit (MMU B) 18 for CPU B 16, a cache memory (CACHE B) 21 for CPU B 16, a snoopy tag directory (SNOOPY TAG DIR. B) 32 for MMU B 18, and a comparator 38 for SNOOPY TAG DIR. B 32. Processor subsystem A and processor subsystem B are coupled to a main memory 22 via a bus 34.

When the central processing unit A 12, for example, requires information from main memory 22 for the operation of a particular process, the information is requested through the memory management unit A 14 by means of a virtual address. The memory management unit A 14 translates the virtual address provided by the central processing unit A 12 into a physical address at which the information resides in the main memory 22, calls that information from the main memory 22, and places it into the cache memory A 20 at a cache position indicated by the virtual index (the 13 low order bits of the virtual address plus the 5 additional offset index bits) sufficient to indicate the page-sized block of the cache in which it lies. Thus, the particular information resides in the virtual cache at a unique position determined by the virtual index.

Stored in the memory of each virtual cache is a virtual directory of the information stored in the virtual cache. The virtual directory includes the virtual addresses of the information stored in that particular cache along with certain information regarding permissions relating to such information.

The snoopy tag directories 30 and 32 are second (or dual) directories each of which stores the address of the page in physical memory of the information stored in the virtual cache with which it is associated. The snoopy tag directories 30 and 32 also store the virtual index including the 13 low order bits of the virtual address which define the offset within each page and the 5 offset index bits defining the page-sized portion of the associated virtual cache in which the information is located. Thus, for any particular piece of information stored in a virtual cache, dual directories exist, the virtual directory listing the virtual addresses and the snoopy directory listing the physical addresses associated with the virtual address of the information.

When a central processing unit writes information to a virtual cache, both the cache itself, other caches, and the physical memory must be updated or invalidated so that another cache accessing the same physical memory is not provided stale information. The use of a snoopy directory allows the system 10 to be able to rapidly update those cache memories which contain information being updated by a central processing unit. When a write signal is sent to a virtual cache by a central processing unit, a virtual address tag is sent to the memory management unit associated with that cache, and virtual memory management unit translates the virtual address to a physical address and broadcasts that physical address on the bus along with the virtual index to all of the snoopy tag directories. At each snoopy directory, the virtual index from bus 34 is used to index into the snoopy directory to produce the physical address of the information stored at the same virtual index in the cache memory. The physical address produced by the snoopy directory is provided to comparator (such as comparator 36) and compared with the physical address on the bus 34. If the physical addresses from the snoopy directory and the physical address on the bus 34 match, then the line of cache memory identified by the virtual index is invalidated. The combination of the physical address and the virtual index allows the directory to unambiguously determine whether the information at that physical address is included within the virtual cache associated with that snoopy tag directory. Only at those directories containing information related to the same portion of physical memory is the virtual cache updated or invalidated. By the use of the snoopy tag directories, utilization of the bus is lessened and system operation is speeded.

By restricting the virtual address size to be "modulo" the cache size for sharing purposes, it is possible to use the same virtual index bits for indexing both virtual and physical (snoop) cache tags.

Referring again to FIG. 2, when the write signal is sent to the cache B 21, a signal is sent to the memory management unit B 18 indicating the virtual address including the virtual index of the storage position to which the data is to be written. The memory management unit B 18 translates the virtual address in a manner well known to the prior art to the physical address and places the physical address along with the virtual index (the 18 lower bits of the virtual address necessary to define the single position of the information in the virtual cache which is extracted from virtual address set out by the processor B 16) on the bus 34. This address information is provided to each of the snoopy tag directories 30 and 32. At each snoopy tag directory, the snoopy tags are indexed by the virtual index (composed of the 13 low order bits of the virtual address and the 5 bit offset index); and a comparison is made by the comparator to determine whether the physical address on the bus 34 matches the physical address in the snoopy directory. In the example given, the physical addresses and the virtual index are the same for the virtual caches A and B; consequently, the snoopy tag directory A 30 indicates to the system 10 that the information at the particular position of the cache memory A 20 is stale and must be rewritten or ignored. Depending on the particular system involved, one or the other may occur. Depending on the particular system involved, the rewriting of the main memory position may take place immediately or be delayed until a convenient clock time at which no time loss is placed on the system.

It will be understood by those skilled in the art that in order to implement this system, it is necessary to add a few wires (for example, five or six wires) to the bus 34 in order to allow the physical address and the virtual index to be placed on the bus at the same time. These extra five or six wires are a number sufficient to indicate the exact page-sized position within a virtual cache. This is a relatively small increase in hardware in order to resolve the problem created by plural virtual caches addressing the same physical memory.

Although the invention has been described with reference to particular arrangements and systems, it will be apparent to those skilled in the art that the details of those arrangements and systems are used for illustrative purposes and should not be taken as limitations of the invention. It is, thus, to be contemplated that many changes and modifications may be made by those of ordinary skill in the art without departing from the scope and spirit of the invention. The invention should therefore be considered to be described only in terms of the claims which follow.

What is claimed is:

1. A multiprocessor computer system, said multiprocessor computer system comprising the elements of:
   a bus structure, said bus structure carrying information within said multiprocessor computer system;
   a) a first processor subsystem, said first processor subsystem comprising
      i) a first processing unit, said first processing unit generating a first plurality of virtual addresses, said virtual addresses comprising a plurality of bits wherein a subset of said bits comprise a first virtual index, said first virtual index broadcast on said bus structure;
      ii) a first cache memory unit, said first cache memory unit coupled to said first processing unit, said first cache memory unit addressed using said first plurality of virtual addresses, said first cache memory unit comprising a plurality of cache entries, said cache entries indexed using said first virtual index;
      iii) a first memory management unit, said first memory management unit coupled to said first processing unit, said first memory management unit translating said first plurality of virtual addresses into a correspond plurality of physical addresses, said physical addresses broadcast on said bus structure;
   b) a second processor subsystem, said second processor subsystem comprising
      i) a second processing unit, said second processing unit generating a second plurality of virtual addresses, said second plurality of virtual addresses comprising a plurality of bits wherein a subset of said bits comprise a second virtual index, said second virtual index broadcast on said bus structure;
      ii) a second cache memory unit, said second cache memory unit coupled to said second processing unit, said second cache memory unit addressed using said second plurality of virtual addresses, said second cache memory unit comprising a plurality of cache entries, said cache entries indexed using said second virtual index;
      iii) a second memory management unit, said second memory management unit coupled to said second processing unit, said second memory management unit translating said second plurality of virtual addresses into a correspond plurality of physical addresses, said physical addresses broadcast on said bus structure; and
   a main memory, said main memory coupled to said bus structure, said main memory addressed by said physical addresses;
   wherein if a first unit of information in said first cache memory having a first virtual index value from a first virtual address value has the same physical address value as a second unit of information in said second cache memory having a second virtual index value from a second virtual address value then said first virtual index value and said second virtual index value are equal.

2. The multiprocessor computer system as claimed in claim 1 wherein said second processor subsystem further comprises:
   a snoopy tag directory, said snoopy tag directory coupled to said bus
      structure, said snoopy tag directory comprising a listing of physical addresses for said cache entries in said second cache memory unit, said snoopy tag directory outputting one of said physical addresses when indexed by a virtual index on said bus structure;
   a comparator, said comparator coupled to said bus structure and said snoopy tag directory, said comparator comparing physical addresses received from said bus structure and said snoopy tag directory; and
   an invalidation mechanism, said invalidation mechanism invalidating an entry in said second cache memory unit as indexed by a virtual index on said bus structure when said comparator detects a match.

* * * * *